United States Patent

[11] 3,604,298

[72] Inventor Chester Dekiel
21 W. 185 River Drive, Glen Ellyn, Ill. 60137
[21] Appl. No. 845,627
[22] Filed July 7, 1969
[45] Patented Sept. 14, 1971
Continuation of application Ser. No. 719,050, Apr. 5, 1968, now abandoned.

[54] DIE SET FOR PUNCH PRESS HAVING ADJUSTABLE DIE ALIGNING MEANS
2 Claims, 4 Drawing Figs.

[52] U.S. Cl. .................................................. 83/694,
74/86, 83/699, 85/8.1, 287/189.36
[51] Int. Cl. ...................................................... B26d 1/10,
F16h 33/10
[50] Field of Search .......................................... 85/8.1, 8.3,
7, 5; 287/189.36 D, 100, 127; 285/93; 83/694,
699, 700; 74/86, 102, 570–71, 251, 254, 600, 602;
308/65, 3; 100/229, 224, 214, 295, 299; 59/86;
16/168, 169

[56] References Cited
UNITED STATES PATENTS

| 1,296,275 | 3/1919 | Firth............................ | 85/1 H |
| 2,213,919 | 9/1940 | Michon........................ | 83/699 X |
| 2,242,363 | 5/1941 | Michon........................ | 83/699 X |
| 2,733,082 | 1/1956 | Backhouse.................. | 74/570 UX |
| 3,072,423 | 1/1963 | Charlton...................... | 74/570 X |
| 3,122,048 | 2/1964 | Warner........................ | 83/700 X |

Primary Examiner—Ramon S. Britts
Attorney—Johnston, Root, O'Keeffe, Keil, Thompson and Shurtleff ABSTRACT: A die set for a punch press including a reciprocable die unit and a stationary die unit having coacting shearing edges spaced apart a desired distance and means for readjusting the desired spacing after one of the shearing edges has been reground comprising a plurality of dowel pins. Each of the dowel pins consists of two axially offset cylindrical segments joined together at their bases to define a pair of crescent-shaped shoulders.

PATENTED SEP 14 1971
3,604,298
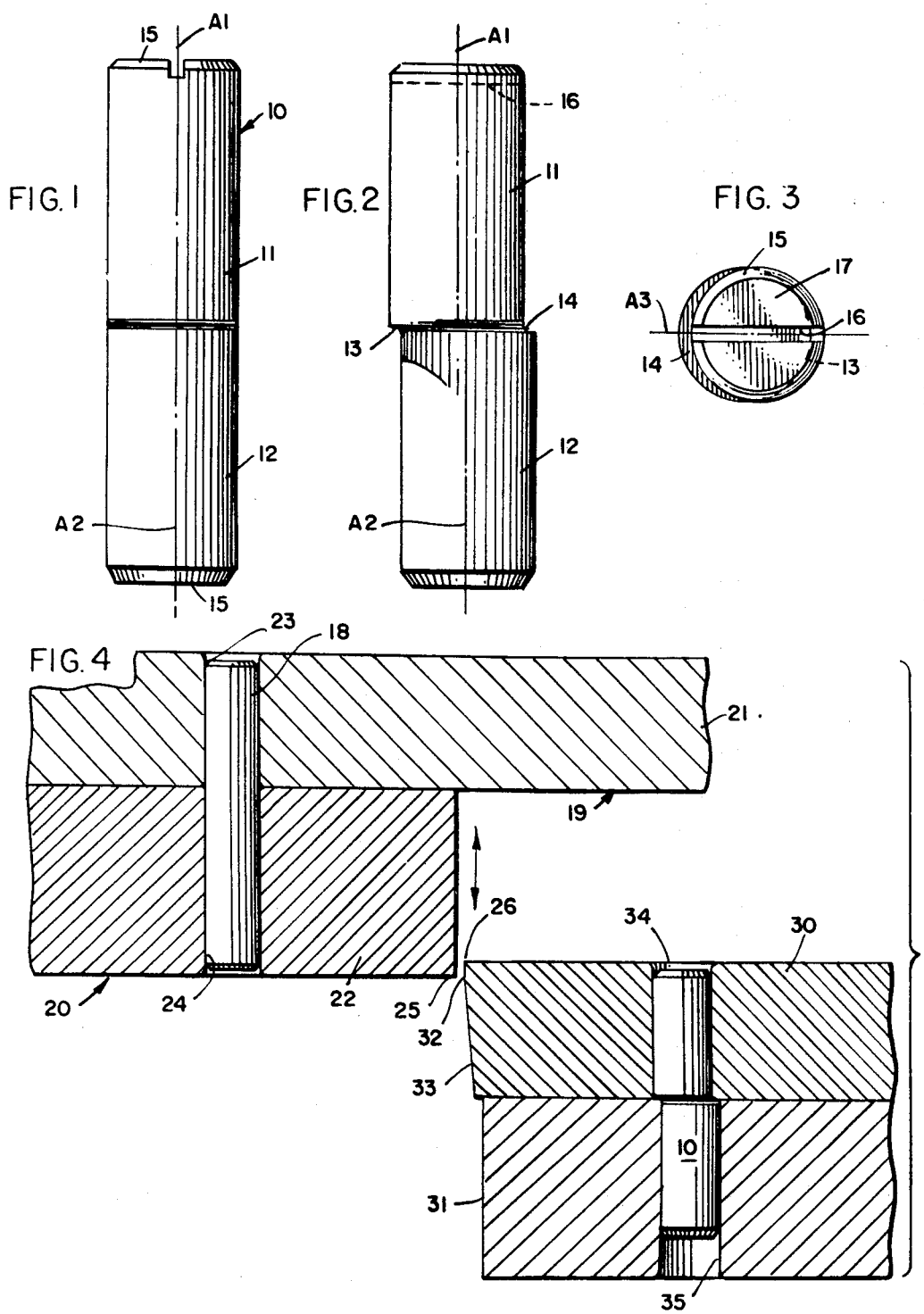
INVENTOR:
CHESTER DEKIEL
BY
Marzall, Johnston, Cook & Root
ATT'YS

DIE SET FOR PUNCH PRESS HAVING ADJUSTABLE DIE ALIGNING MEANS

This application is a continuation of copending application Ser. No. 719,050 filed Apr. 5, 1968, now abandoned.

BACKGROUND OF THE INVENTION

The invention herein has application to improvements in alignment of machine parts through use of dowel pins. Taking die sets for punch presses as an example, straight dowel pins, usually two in number, are used to mount each die on the die shoes for the purpose of providing proper alignment between the punching dies. The spacings between the dies are usually in the order of several thousandths. When the edges of either die become worn or chipped, the common practice is to grind off the upper face of the die until the worn or chipped area is removed. This procedure is used to maintain within prescribed tolerances the permissible spacing between the dies.

However, when the shearing edge of a die becomes badly damaged or worn, the die often has been discarded. If the die were moved laterally to compensate for the wear loss of its shearing edge, plugging and redrilling the straight dowel pinholes in the die shoe is necessary. By use of an offset dowel pin of this invention, any die (or other machine part) can be shifted laterally toward or away from the other die (or other machine part) by the amount of offset in the dowel pin. This allows worn or chipped dies to be ground on the side face of the die life, rather than on the upper surface of the die life, and resetting of the die with the proper amount of offset in the dowel pin to regain the desired spacing between the dies.

BRIEF DESCRIPTION OF THE INVENTION

The improvements herein concern dowel pins with axially offset cylindrical segments useful in realigning machine parts. These dowel pins are machined to a close tolerance of diameters of the respective cylindrical segments and also the distance or degree of offset of the respective parallel, longitudinal axes of the cylindrical segments.

The invention herein provides dowel pins, preferably provided in sets of predetermined diameters of the cylindrical segments and with various, predetermined offsets, wherein each offset dowel pin consists essentially of two, axially offset, cylindrical segments with substantially parallel longitudinal axes and a pair of crescent-shaped shoulders at the juncture of said segments. The end face has straight line indicia means, e.g., the diametric groove, substantially aligned with the transverse axis of maximum offset of the segments. In a set of said dowel pins, the individual pins preferably have predetermined, progressively different amounts of offset.

BRIEF DESCRIPTION OF THE DRAWINGS

A preferred embodiment of the invention and an exemplary use thereof in the mounting of dies on die shoes of a die set for a punch press is illustrated in the drawings, wherein:

FIG. 1 is a front elevation of the offset dowel pin;

FIG. 2 is a side elevation thereof;

FIG. 3 is a top plan view thereof; and

FIG. 4 is a fragmentary, sectional view of upper and lower dies of a die set with the offset dowel pin employed in mounting the die on the lower die shoe.

DESCRIPTION OF PREFERRED EMBODIMENT

Referring to the drawings, the offset dowel pin 10 comprises two axially parallel, cylindrical segments 11 and 12 having a predetermined amount of axial offset of the substantially parallel longitudinal axes A1 and A2. Substantially planar, crescent shaped shoulders 13 and 14 are provided at the point of juncture between the cylindrical segments 11 and 12. The respective ends of the segments 11 and 12 may have frustoconical tapers 15 to facilitate insertion into the dowel pin receiving holes.

The outer end 17 of segment 11 is provided with a diametric slot or groove 16 of a size to receive a screw driver or like tool, which can be used as a straight line indicia means to set the orientation of the offset dowel pin in a machine part prior to mounting the other machine part thereon. The amount or degree of axial offset is predetermined for each dowel pin. The slot or groove 16 is oriented so that it is parallel with the transverse axis of maximum offset of the segments 11 and 12 so that the slot or groove 16 serves as a straight line visual indicia of the major axis or direction of offset 3A.

The cylindrical segments 11 and 12 may be of like or different diameters, depending upon the diameters of the respective holes in which the segments are seated in respective machine parts. The cylindrical segments 11 and 12 are generally, though not essentially, of like diameter. The amount or degree of axial offset of these segments is machined to the amount desired. A set of offset dowel pins available for purchase as part of a machine shop inventory will include dowel pins of different diameters of the respective segments 11 and 12, e.g. 5/16, 3/8, 7/16, 1/2, 9/16, 3/4, 7/8 and 1 inch. Within each such diameter, the set of dowel pins will include axial offsets in predetermined amounts, e.g., 0.002, 0.004, 0.006, 0.008, 0.010 and 0.012 inches and upward.

Referring to FIG. 4 there is shown in fragmentary cross section view a die set 20 having a vertically reciprocable upper die unit 19. An upper die 22 is mounted on the under surface of the upper die shoe 21 by bolts or the like, not shown. Upper die 22 is aligned or oriented on the shoe 21 by a straight dowel pin 18 positioned in dowel pin receiving holes or apertures 23 or 24. If desired or necessary, the straight dowel pin 18 may be replaced by an offset dowel pin, particularly in cases where the upper die 21 is made up of a plurality of die segments which as a composite form the upper die 22.

The lower die 30, a male die composed of a plurality of die segments (one of which is shown), is positioned in the die set so that the shearing edge 25 of the upper die 22 has a predetermined spacing 26 from the vertical edge 32 of the die life (upper portion of lower die 30). The edge of die 30 has an inwardly sloping face 33 below the die life to provide clearance for metal removed by the punching operation.

Lower die 30 is mounted on a lower die shoe 31 of the die set. Each of the segments of the dies 22 and 30 and their respective shoes 21 and 31 have holes drilled therethrough, usually in diagonally opposite corner portions of the pair of dies. In the normal layout of the die set, the holes of each pair of holes 23, 24 and 34, 35 are axially aligned and straight dowel pins 18 are mounted therein if the drilling thereof is precise enough. However, when worn or chipped dies are machined by removing material from the die life edge 32, a new alignment is required. Also, if drilling errors in the manufacture of the dies occur, which errors are the result in a spacing between the edges of the dies of a die set outside allowable tolerances, the offset dowel pins may also be used to correct the spacing error by moving the lower die shoe segments. For these purposes an offset dowel pin 10 is selected whereby the axial offset thereof provides the desired spacing indicated at 26 between the die 22 and the die 30. After setting of each segment of the die 30 on die shoe 31 by use of two dowel pins 10 with the proper amount of offset to provide the aforesaid amount of spacing indicated at 26, the segments of die 30 are fixedly secured to the die shoe 31 by use of bolts or other fastening means, not shown.

The advantages accruing from the invention are several. Machining errors in the manufacture of machine parts through incorrect positioning of dowel pin holes need not be recorrected by time-consuming replugging and redrilling of such holes for proper alignment through the use of straight dowel pins. Instead these errors can be corrected through proper selection of the subject offset dowel pins. Also, when the shearing edges of dies have become chipped or worn, a common practice heretofore has been to grind the upper surface of the die to a depth of material removal sufficient to eliminate the chipped or worn edge. Such grinding practice was dictated by the necessity of maintaining the alignment of the dowel pinholes of the die and the die shoe. By the use of offset dowel pins, it is now possible to grind only the die life edge 32 to a depth sufficient to eliminate the chipped or worn edge of the die and thereafter mount the die on the die shoe with proper spacing as indicated at 26 through utilization of the offset dowel pins. It will be appreciated that the savings are appreciable in machining costs and in continued use of dies heretofore discarded or scrapped.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

I claim:

1. In a die set useful in a punch press, said die set including a reciprocable die unit and a stationary die unit, each die unit comprising a die shoe and a die mounted thereon, said dies having respective, coacting shearing edges spaced apart a desired distance, one of said shearing edges being a reground die life edge lying in the shearing plane, and dowel pins extending through respective pairs of holes drilled in respective die shoes and dies and aligning said dies in said die units with said desired spacing between shearing edges of said dies, the improvement comprising at least one of said die units having a plurality of offset, one piece dowel pins, each of said offset dowel pins consisting only of two, axially offset, smooth surfaced, cylindrical segments with substantially parallel longitudinal axes and joined together at their respective bases, the projecting portions of said bases providing a pair of oppositely disposed crescent-shaped shoulders at the plane of juncture of said segments, said plane of juncture lying in the plane of contact of said die shoe and die, the plane of maximum axial offset of said segments extending at right angles to the plane of said die life edge, and the amount of maximum axial offset thereof repositioning the die on its die shoe to provide said desired spacing between the reground die life edge and the coacting shearing edge of the other die during operation of said punch press.

2. A die set as claimed in claim 1, and an end face of one of said segments having a diametric groove extending thereacross substantially in alignment with the transverse axis of maximum offset of said segments to provide straight indicia means on said face for orienting said dowel pins in said holes.